United States Patent [19]

Guimont

[11] Patent Number: 5,801,453

[45] Date of Patent: Sep. 1, 1998

[54] PROCESS FOR PREPARING SPHERICAL ENERGETIC COMPOUNDS

[75] Inventor: John Guimont, Cupertino, Calif.

[73] Assignee: United Technologies Corporation, Hartford, Conn.

[21] Appl. No.: 661,437

[22] Filed: Jun. 11, 1996

[51] Int. Cl.$^6$ ........................................... C06B 21/00
[52] U.S. Cl. ........................ 264/3.5; 264/3.1; 264/3.6
[58] Field of Search .................... 264/3.1, 3.5, 3.6; 423/385

[56] References Cited

U.S. PATENT DOCUMENTS

| | | | |
|---|---|---|---|
| 2,938,233 | 5/1960 | Nack et al. | 18/47.2 |
| 3,120,026 | 2/1964 | Russell et al. | 264/3.5 |
| 3,716,315 | 2/1973 | King | 425/8 |
| 3,754,061 | 8/1973 | Forrest et al. | 264/3.6 |
| 4,065,529 | 12/1977 | Lavertu et al. | 264/3.5 |
| 4,101,301 | 7/1978 | Rigbi | 264/3.5 |
| 4,172,866 | 10/1979 | Graham et al. | 264/3.6 |
| 4,902,036 | 2/1990 | Zander et al. | 280/736 |
| 4,925,600 | 5/1993 | Hommel et al. | 364/3.4 |
| 5,198,204 | 3/1993 | Bottaro et al. | 423/385 |
| 5,240,524 | 8/1993 | Chattopadhyay | 199/46 |
| 5,254,324 | 10/1993 | Bottaro et al. | 423/263 |
| 5,316,749 | 5/1994 | Schmitt et al. | 280/736 |
| 5,324,075 | 6/1994 | Sampson | 280/736 |
| 5,354,520 | 10/1994 | Oliver et al. | 264/3.4 |
| 5,415,852 | 5/1995 | Schmitt et al. | 423/385 |

*Primary Examiner*—Peter A. Nelson
*Attorney, Agent, or Firm*—McAulay Fisher Nissen Goldberg & Kiel, LLP

[57] ABSTRACT

A method for producing substantially spherical energetic compounds such as ammonium dinitramide (ADN) which minimizes the time during which the ADN is melted involves providing solid ADN, feeding the ADN at a controlled continuous rate to a heating means, melting the ADN, the melted ADN being fed continuously to a non-solvent cooling fluid maintained at a temperature below the temperature of solidification of the ADN, the cooling fluid agitated in a manner which promotes the formation of droplets of controlled size which solidify in the cooling fluid to produce substantially spherical ammonium dinitramide in a particle size corresponding to the droplet size.

10 Claims, 2 Drawing Sheets

PROCESS FOR PREPARING SPHERICAL ENERGETIC COMPOUNDS

TECHNICAL FIELD

This invention relates to gas generating and/or propellant compounds, and more particularly to the preparation of energetic compounds such as ammonium dinitramide in substantially spherical form.

BACKGROUND OF THE INVENTION

Ammonium dinitramide is a non-chlorine containing oxidizer useful in rocket propellant and gas generating devices such as air bag inflators. For example, in U.S. Pat. No. 5,324,075, ammonium dinitramide is described as a preferred gas generator for air bags. In U.S. Pat. No. 5,316,749, a process for producing stable ammonium dinitramide salts is disclosed for use in a smokeless rocket propellant. While ammonium dinitramide compounds have useful functional properties, they suffer from physical limitations which renders their use impractical.

For example, ammonium dinitramide ("ADN") crystallizes naturally in the form of needles or plates which are not readily amendable to subsequent processing. For use as a propellant or gas generator, it is necessary to use solid particulate ammonium dinitramide of controlled size to obtain particulate ammonium dinitramide of controlled size to obtain predictable results. Particles in the range of about 10 to 1,000 microns are considered useful. However, efforts to control crystallization or to physically process solid ADN to obtain a selected particle size have been unsuccessful, as solid ADN cannot be ground or subject to other physical processing due to its low stability.

One method for producing particulate ammonium dinitramide is to melt ADN in a non-solvent fluid, vigorously stirring to disburse the ADN, then rapidly cooling the mixture before the melted ADN coagulates.

This process is not suitable because melted ADN can decompose violently if it remains melted for too long a period of time. Also, to minimize the potential damage if decomposition were to occur, the total amount of ADN in the fluid must be minimized. While possibly adequate for producing laboratory size quantities of ADN, such a method cannot be used to produce the large quantities of material necessary, i.e. for use as a propellant.

SUMMARY OF THE INVENTION

It is an object of the present invention to provide a substantially spherical solid energetic compound such as ADN of controlled size, with a limited melt processing time.

It is a further object to provide a continuous process for producing substantially spherical energetic compounds such as ADN in large scale processing equipment, to produce large quantities of useful material.

These and other objects of the present invention are achieved by a method of producing a substantially spherical energetic compound comprising:

providing a solid energetic compound;

feeding the solid energetic compound in a continuous controlled rate to a heating means;

melting the energetic compound in the heating means;

providing an agitated cooling fluid maintained at a temperature below the temperature of solidification of the energetic compound; and adding the melted energetic compound in a rate comparable to the controlled feed rate, into the agitated cooling fluid such that the energetic compound forms droplets after entering the fluid, which solidify in substantially spherical form.

The agitated cooling fluid is stirred in an amount sufficient to disperse the liquid energetic compound into droplets of the desired size. A stream of the cooling fluid is fed to a filtration device to remove the spherical energetic compound, with return of the fluid for continued use in the process.

Utilizing the inventive method, the amount of the energetic compound, such as ADN, which is melted at any one time is minimized, and the energetic compound is in a melted state for a very short time. This minimizes the potential for decomposition. Further the energetic compound is readily separated from the cooling fluid by filtration, and subsequently washed, dried and stored for use. By controlling the fluid temperature, rate of addition, and degree of agitation, it is possible to obtain a fairly consistent particle size in the preferred range of from about 10 to about 1,000 microns.

DETAILED DESCRIPTION OF THE INVENTION

This invention, while hereinafter described in relation to ammonium dinitramide, is also applicable to other energetic compounds which are those that are potentially unstable and difficult to process into substantially spherical form. For example, 1, 3, 3—Trinitroazetidine is an energetic compound which may be processed in accordance with the present invention, and the invention is not limited to ADN.

The terms "spherical" and "substantially spherical" are used interchangeably refer to the formation of grains or particles of the energetic compound, as typically classified by percent of passage through a particular mesh screen. As is well known, such particles are classified by the amount of material which passes through a screen having a known open area. A perfect sphere shape is not necessary but rather a substantially spherical particle size.

The energetic compound, such as ammonium dinitramide, may be obtained through known processes. For example, U.S. Pat. No. 3,428,667 to Hamill et al. describes the reaction of an ionic nitronium salt with a primary organic nitramine to form N,N-dinitramine having the general formula R-$[N(NO_2)_2]_n$, where n is 1–2 and r is a monovalent or divalent organic radical.

Figure 1:
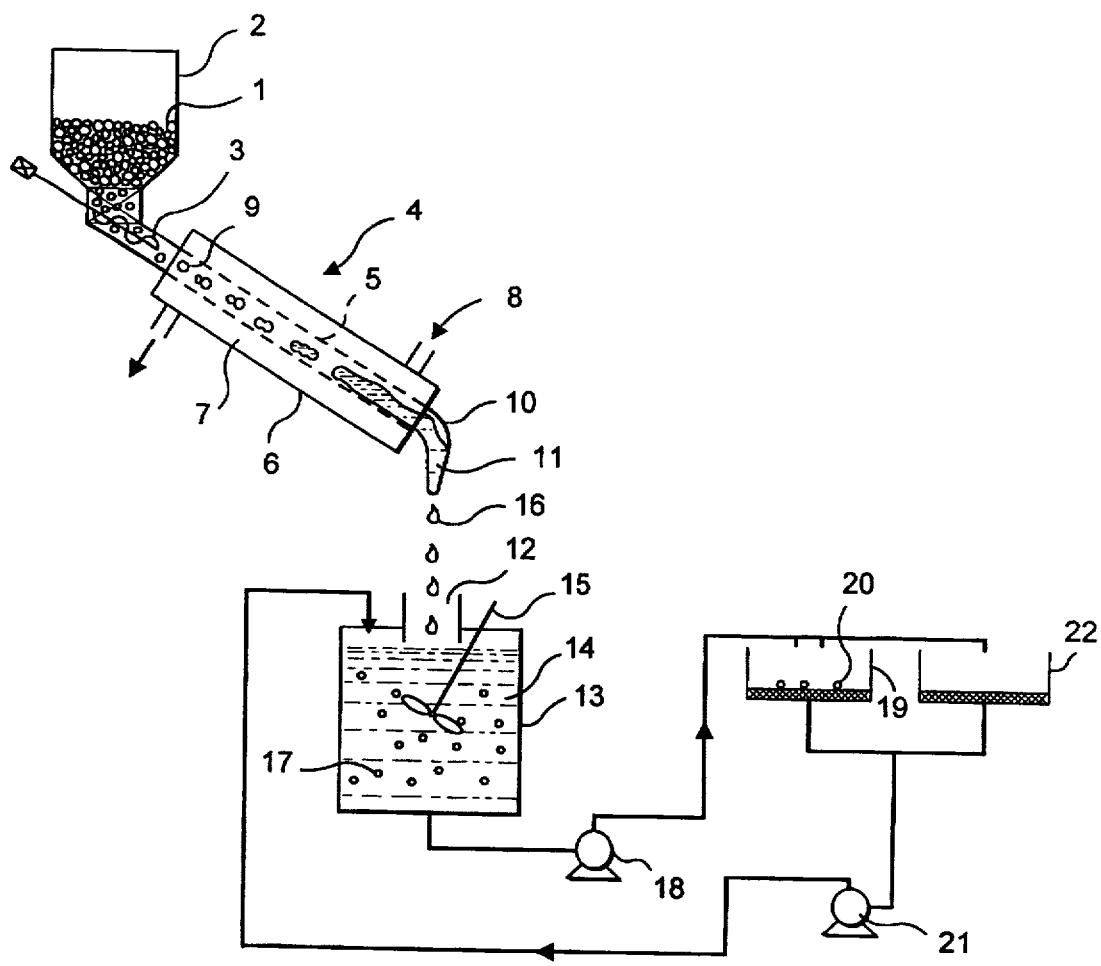
FIG. 1 is a schematic view of the process of the present invention.

Referring to FIG. 1, a solid energetic compound 1 in powdered form, is placed in a fed hopper 2 which is connected to a conveyor 3. The conveyor may be of any suitable type such as a screw conveyor, belt conveyor, etc. for transporting solid materials at a controlled rate. Controllability is necessary to assure delivery of a selected quantity of the compound at a selected rate.

A heating device is located at a discharge end of the conveyor. The heating device shown is a double pipe heat exchanger 4, having two co-axial pipes, an inner pipe 5 through which the compound is processed, and an outer pipe 6, defining a space 7 between the pipes, to form a jacket, through which a heating fluid 8 is passed, heating the contents of the inner pipe. The heat exchanger 4 is operated at a temperature sufficient to melt the delivered quantity of the energetic compound. The energetic compound enters the pipe as a solid powder and then is melted within the inner pipe. Once melted, the compound flows to an outlet end 10 of the inner pipe. For example, ADN melts at a temperature of about 100° C., and it is preferred to maintain the heating device at from about 100° C. to about 110° C. so as to avoid overheating of the energetic compound material as it passes through the heating device.

The heating device is preferably placed at a downward angle towards the outlet end to allow gravity flow of the melted energetic compound, from the entrance end to the exit end 10 of the heat exchanger. The exit end is positioned over an opening 12 above a cooling tank 13.

The cooling tank 13 contains a non-solvent fluid 14 subject to mixing by an agitator 15. The cooling fluid is maintained at a temperature below the melt temperature of the energetic compound so that near immediate solidification occurs when the melted energetic compound enters the cooling fluid. Preferably, the cooling fluid is maintained at a temperature of about 20° C. when processing ADN.

After the energetic compound has entered the cooling fluid, and before solidification, it is dispersed into substantially spherical droplets of the desired size by the agitator, which shears and distributes the droplets prior to solidification. The agitation also maintains the separation of the droplets until solidification occurs.

A portion of the cooling fluid is then fed by a pump 18 to a filtration device 19 where the solid substantially spherical energetic compound 20 is captured. The cooling fluid is then fed by a pump 21 back to the cooling tank.

Preferably a second filtration device 22 is available so as to allow continuous operation in the production of the spherical particles, with the second filtration device brought on line to allow washing, drying and removal of the solid spherical energetic compound from the first filtration device 19.

Utilizing the present invention, a continuous process for producing an energetic compound, particularly ADN is achieved. Further, the amount of energetic compound subject to melting is minimized, as is the time during which the compound is in liquid form.

Figure 2:
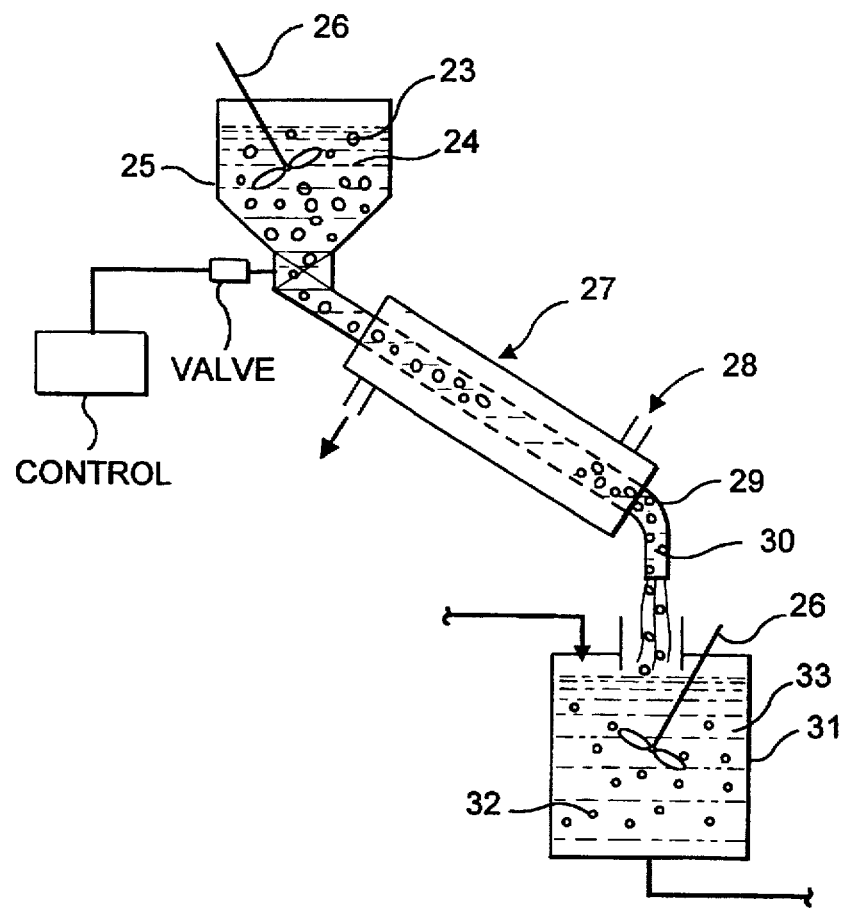
FIG. 2 is an alternative process according to the present invention.

Referring to FIG. 2, an alternative embodiment of the present invention is shown.

In this method, the energetic compound 23 is placed in a carrier fluid 24 contained in a tank 25. The carrier fluid is preferably identical to the non-solvent cooling fluid. Thus, the energetic compound is mixed with the carrier fluid to produce a slurry within which the solid energetic compound is dispersed. Preferably, the liquid is continuously stirred by an agitator 26 to maintain the dispersion of the energetic compound within the liquid. Then, a portion of the slurry is fed to a heat exchanger 27, such as the double pipe heat exchanger described above. As previously, a heating fluid 28 heats the mixture in the inner pipe above the melting point of the energetic compound, causing the compound to melt. Since the energetic compound is not soluble in the carrier fluid, it separates into a second liquid phase 29. The two phase fluid can then be fed from an outlet end 29 in a controlled liquid rate to a stirred cooling tank 31 where the energetic compound phase is dispersed by the agitator into droplets 32 which solidify in a cooling fluid 33, again producing a substantially spherical particle product. As described above, a stream of cooling fluid containing the solid spherical particles can be fed to a filtration device for recovery of the solid energetic compound and return of the cooling fluid to the process.

Various non-solvent fluids can be used to contain the solid energetic compound, such as mineral oil, fluorocarbon oil, silicone oil, etc. Any non-solvent fluid of sufficiently high boiling point may be used, "non-solvent" meaning that the energetic compound will not react with the non-solvent at or above its melting temperature.

Utilizing the present invention, energetic compounds, such as ADN, can be obtained in sizes of from about 10 to about 1,000 microns with the range dependent on the cooling fluid temperature, rate of addition, agitation speed, drop location, etc. For example, if fed closer to the agitator, more physical disruption of the droplet size is likely, reducing the particle size. On the other hand, less agitation combined with a higher rate of addition, will allow larger droplets to form and solidify without breakage. For use as a propellant, it is preferred that ADN be produced with a particle size below about 425 micron, preferably with the majority of particles in the 10–200 micron range.

EXAMPLE

One kilogram of powdered ADN containing 0.1 to 2% of stabilizer (hexamine) was placed in a feed hopper. A Teflon coated screw feed conveyor was used to deliver 100 grams per hour of ADN to a double tube heat exchanger. Hot water circulated through the heat exchanger at a temperature of about 100° C., allowing the ADN to melt. A 1.5 millimeter capillary end was fitted to the exit end of the heat exchanger, to promote droplet formation. The heat exchanger was placed at an angle of about 20° C. to promote gravity flow of the melted ADN to the exit end. A cooling tank containing mineral oil was positioned below the exit end, the tank having cooling coils for maintaining the temperature of the tank at about 20° C. A baffle was provided adjacent to the capillary end to maintain a constant stirred environment adjacent to the droplet entry point. The agitator was of variable speed to adjust the degree of agitation in the baffle area, having an adjustment range of 2,000–4,000 rpm. The agitator was set at a speed of about 3,400 rpm, the agitator having a diameter of 1¾". Using the apparatus described, of the solids produced 65% was the diameter of choice, substantially spherical ADN having a particle size of less than 425 microns.

The experiment was repeated with a 2½ diameter agitator, set at 2,300 rpm, to generate the same tip speed for shearing the droplets and the same amount of substantially spherical ADN, having a particle size of less than 425 microns was obtained.

Using the present invention, a continuous process for producing spherical energetic compounds such as ammonium dinitramide is provided, allowing production of large quantities of spherical material with a minimum melt quantity maintained at the melting temperature for a minimum time. The parameters for adjusting particle size are easily controlled, i.e. by increasing agitation speed to adjust the processing for producing different size products, with total recycle of the cooling fluid. Thus, material and equipment costs are minimized while safety is enhanced using the process of the invention.

What is claimed is:

1. A method for producing a substantially spherical energetic compound comprising:
   providing a solid energetic compound;
   feeding the solid energetic compound in a rate controlled continuous stream to a heating means;
   melting the energetic compound in the heating means;
   providing a non-solvent cooling liquid maintained at a temperature below the solidification temperature of the energetic compound;

adding the melted energetic compound at a rate which corresponds substantially to the solid feed rate into the cooling liquid; and, controllably agitating the cooling liquid to disperse the melted energetic material into droplets of controlled size; such that the droplets are solidified in the cooling liquid into substantially spherical particles, the particles size corresponding to the droplet size.

2. The method of claim 1 further comprising providing a carrier liquid and mixing the solid energetic compound with the carrier liquid before feeding to the heating means.

3. The method of claim 1 further comprising separating the solidified particles from the cooling liquid.

4. The method of claim 1 wherein the melted energetic compound is added to the cooling liquid close to a source of agitation.

5. The method of claim 1 wherein the energetic compound is ammonium dinitramide.

6. The method of claim 5 wherein the heating means is maintained at a temperature of about 100°–1100° C.

7. The method of claim 6 wherein the cooling liquid is maintained at a temperature less than 100° C.

8. The method of claim 5 wherein the cooling liquid is maintained at a temperature of from about 10°–90° C.

9. The method of claim 5 wherein the temperature of the cooling liquid is maintained at about 20° C.

10. The method of claim 1 wherein the non-solvent cooling liquid is selected from the group consisting of mineral oil, silicone oil and fluorocarbon oil.

* * * * *